UNITED STATES PATENT OFFICE.

HAROLD BOERICKE, OF NEWMIRE, COLORADO.

PROCESS FOR EXTRACTING VANADIUM FROM VANADIUM ORES.

1,105,244.

Specification of Letters Patent. Patented July 28, 1914.

No Drawing. Application filed March 27, 1912. Serial No. 686,706.

*To all whom it may concern:*

Be it known that I, HAROLD BOERICKE, a citizen of the United States, residing at Newmire, in the county of San Miguel and State of Colorado, have invented a certain new and useful Process for Extracting Vanadium from Vanadium Ores, of which the following is a specification.

The process relates to the treatment of vanadium ores. Heretofore in the treatment of such ores it has been the common practice to submit a mixture of the ore and sodium chlorid to an oxidizing roast in a reverberatory or other furnace, in which the heat of the furnace causes the breaking up of the sodium chlorid into chlorin and sodium, the former passing out of the furnace while the latter is left free to combine with the vanadium in the ore to produce sodium vanadate. As a comparatively high heat is essential to secure the breaking up of the sodium chlorid, the cost of fuel incident to the process is a very considerable item, and as the mixture must be subjected to a long heat the furnace capacity is necessarily limited. My invention has for its principal object the provision of a process wherein the objections to the old process as heretofore cited are avoided and wherein the vanadium values of the ore may be extracted at a lower heat and in a shorter time than is required by the old process.

In the preferred practice of my improved process I add to the usual mixture of ore and sodium chlorid metallic sulfids for the production of sulfates or a direct addition of sulfates in any percentage which the case may require; for instance by the addition of 1% of iron sulfate to the ordinary mixture of ore and sodium chlorid I have effected a saving of fuel of 50% and at the same time have increased the capacity of the furnace nearly 100% without seriously affecting the yield of soluble vanadates. Where the vanadium in the ores is of such a nature as to require oxidation my invention is of especial benefit, owing to the free liberation of chlorin which is a strong oxidizing agent.

In the case or iron sulfate the reaction would be shown by the following formula—

$$4NaCl + 2FeSO_4 + 3O = 4Cl + 2Na_2SO_4 + Fe_2O_3.$$

The chlorin effects the oxidation of the ore at a comparatively low temperature and the excess of sodium chlorid used combines readily to form a soluble vanadate. The ferric oxid remains insoluble. In case a sulfid should be used in place of the sulfate above mentioned the sulfid would be oxidized to the sulfate in the heat of the furnace after which the above reaction would take place, so that a metallic sulfate is utilized in the reduction even when the reduction starts with a sulfid, and it will be understood that my invention is generic and includes the use of both the sulfate and the sulfid.

My experience also indicates that the reactions with the substances above stated may follow a somewhat different course than that indicated, although taking place at the same time. This reaction I believe to be as follows:

$$6NaCl + V_2O_3 + 2FeSO_4 + 3O_2 = 2NaVO_3 + 2Na_2SO_4 + Fe_2O_3 + 6Cl.$$

The sodium meta vanadate ($NaVO_3$) thus formed is non-volatile and soluble.

Where the vanadium ore to be reduced is $V_2O_5$ instead of $V_2O_3$, the reaction is as follows:

$$6NaCl + V_2O_5 + 2FeSO_4 + 2O_2 = 2NaVO_3 + 2Na_2SO_4 + Fe_2O_3 + 6Cl.$$

It will be noted that the same vanadate ($NaVO_3$) is produced as in the preceding reaction.

The ortho vanadate ($Na_3VO_4$), also non-volatile and soluble, may be formed in treating the two vanadium oxids, $V_2O_3$ and $V_2O_5$ with iron sulfate ($FeSO_4$), the reactions being as follows:

$$10NaCl + V_2O_3 + FeSO_4 + 4O_2 = 2Na_3VO_4 + 2Na_2SO_4 + Fe_2O_3 + 10Cl.$$

$$10NaCl + V_2O_5 + FeSO_4 + 3O_2 = 2Na_3VO_4 + 2Na_2SO_4 + Fe_2O_3 + 10Cl.$$

Having thus described my invention and illustrated its use, what I claim as new and desire to secure by Letters Patent, is the following:

1. The process of extracting vanadium from vanadium ores, which consists in mixing the said ore with sodium chlorid and a metallic compound of sulfur and applying heat, but without volatilizing the vanadium and permitting the sodium to unite with the vanadium forming a soluble sodium vanadate.

2. The process of extracting vanadium from vanadium ores, which consists in mixing the said ore with a haloid salt and an iron compound of sulfur and applying heat.

3. The process of extracting vanadium from vanadium ores, which consists in mixing the said ore with a haloid salt and iron sulfate and applying heat.

4. The process of extracting vanadium from vanadium ores, which consists in mixing the said ore with sodium chlorid and heating sufficiently in the presence of a metallic compound of sulfur to free the sodium and chlorin, without volatilizing the vanadium, and permitting the sodium to unite with the vanadium forming a soluble sodium vanadate.

In testimony whereof I have hereunto signed my name in the presence of the two subscribed witnesses.

HAROLD BOERICKE.

Witnesses:
SYDNEY MAYHEW,
R. S. DAVIS.